6541X
S. ANDREWS.
GAS LAMP.
Patented May 5, 1831.
NO PRINTED COPY OF SPECIFICATION IN OFFICE.
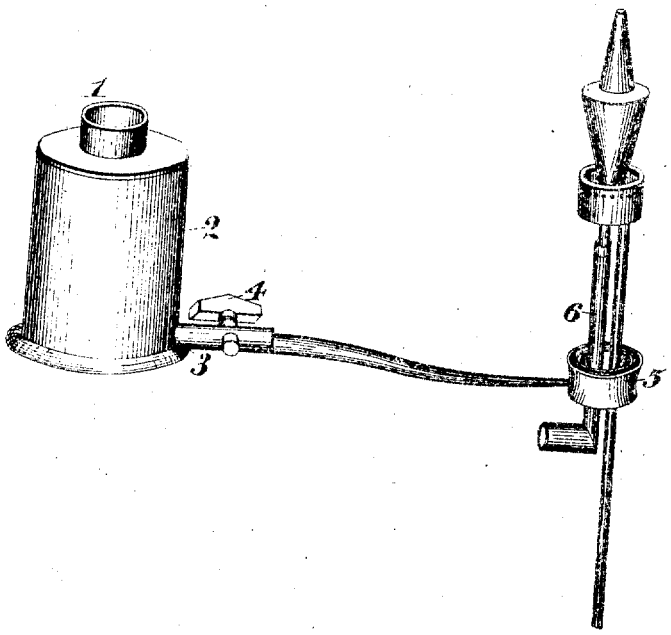

May 5, 1831 64

Solomon Andrews, of Perth Amboy. N. Jersey.

Letters Patent 6541X

The schedule referred to in these Letters Patent and making part of the same containing a description in the words of the said Solomon Andrews himself, of his improvement in commencing the generation of gas, by means of a spirit lamp, filled with alcohol or other highly inflamable fluid —

---

To all persons to whom these presents shall come; Solomon Andrews of the City of Perth Amboy, in the County of Middlesex and State of New Jersey, sends greeting: Be it known that I, Solomon Andrews have invented, construc-ted, made and applied to use, a new and useful improvement in commencing the generation of gas, (by means of a spirit lamp filled with alcohol or other infla-mable fluid) in my new and useful method of generating gas and of supply-ing and continuing gas light out of oil or other suitable substance by means of the gas light itself, in lamps or machines either fixed or moveable for which said new and useful method I have already obtained a Patent, which said new and useful improvement to my said method, I have invented construc-ted made and applied to use since my application for the said patent, and which said improvement is specified in the words following to wit. —

The spirit lamp or machine used for the purpose of commencing the gen-eration of gas, in my said patented gas lamp or machine, may be described with sufficient accuracy by means of, and by reference to the plate annexed; in which is also delineated the patented gas lamp or machine to which it is applied — Figure 1. represents the mouth of the reservoir, through which the alcohol or other fluid used for the purpose may be put into the reservoir. Figure 2, the reservoir containing the fluid. Figure 3. the entrance of the tube into the reservoir. Figure 4. the stop cock. Figure 5. the circular part of the tube or cup like cavity at the extremity thereof, surrounding wholly or in part the conducting tube, to the gas lamp or machine which circular part of the tube or cup like cavity may be made of sufficient capacity to contain the requisite quanty of alcohol or other fluid to light the gas lamp or machine and set it into operation. Figure 6. the conducting tube to the gas lamp or machine which is fully described in the specification accompanying the patent therefor and which is delineated in the plate annexed. In the said specification of the said patent for the gas lamp or machine it is stated that "in order to commence the operation after the oil or other substance used is raised into the bulb it will be necessary to apply heat to the bulb, which may be done by the application of a common lighted candle or lamp and the operation will be facilitated by the use of a small blow pipe. The heat thus applied generates a small portion of gas, which issuing through the orifices in the manner above detailed is inflamed by the applied heat &c. Under this new improvement the requisite heat is applied to the bulb, in the first instance in the following manner: by turning the stop-cock the fluid passes from the reservoir through the tube into the circular extremity or cup like cavity above mentioned when by the application of flame or heat to the open surface above described, the fluid is immediately ignited and without the intervention of wick and the flame rising up and surrounding the bulb of the said gas lamp or machine, applies to the said bulb the requisite heat to commence the generation of gas, to issue through the orifices of the gas lamp or machine, where it is lighted as described in the specification of my said original patent — —

It is difficult to state the precise quantity of the fluid necessary to commence the operation of lighting the gas lamp or machine, but a little experience will soon regulate that matter; a very small quantity of alcohol however, will light the gas lamp or machine. To a common fountain lamp, with which I have used my patented gas lamp or machine, I have attached a small spirit lamp the reservoir of which was capable of containing a half gill of alcohol: and with this half gill I have lighted the gas lamp or machine forty times — The spirit lamp may be entirely detached and only applied when it is wanted to commence the generation of gas in the gas lamp or machine, or the spirit lamp may be attached to the lamp or it may be made a permanent fixture to the lamp, as for instance the reservoir of the spirit lamp may be formed with a cavity in the interior or concentric part thereof, and may be made to surround that part of the fountain lamp into which the oil passes from the fountain. This spirit lamp may be made of any suitable metallic or other substance and it may be varied in form

6541X and proportion in a great variety of ways to suit the taste and views of the manufacturer so long as the principle of the invention is preserved — —

My newly invented improvement which is the subject of this patent, consists in generating gas in the first instance in my new invented gas lamp or machine, and so as to put the new invented gas lamp or machine into operation by means of the flame of the said alcohol or other fluid rising up and surrounding the bulb of the said gas lamp, or machine, and in so constructing and applying the spirit lamp or machine as to produce that effect. Since I applied for my patent for my gas lamp, or machine I have also invented and used the following method of furnishing a supply of gas to commence the process of using my patented gas lamp or machine to wit: I have caused the gas generated in my gas lamp or machine to pass through the gas tube, not immediately into the recipient as described in the specification to my original patent, but into an elastic gas reservoir of a cylindrical form when extended to which that tube was extended, and into which it issued, of which reservoir the heads were made of wood, and the sides or connecting substance of oiled silk, and which might be contracted into folds or be extended. A second gas tube was applied conducting the gas from the elastic reservoir into the said recipient, whence it passed through the orifices thereof and was lighted as described in the specification to my original patent —

When the lights of the gas lamp or machine are put out, by turning a stop cock in the tube leading to the recipient, gas is reserved in the said elastic reservoir; and when the operation of the said gas lamp or machine is to be renewed by turning the said stop cock, the preserved gas passes into the said recipient when it may be immediately lighted at the orifices, and the inflamed gas heating the bulb continues the operation as described in my original patent. I do not think this as good a mode as the spirit lamp above specified, because it would require a reservoir of such dimensions as would be inconvenient for common use, and this is not to be considered as included in my patent; but I am inclined to think this mode may be advantageously used in connexion with my patented gas lamp or machine in light houses — In testimony that the above is a true specification of 70 6541 X my said improvement as above described. I have hereto set my hand and seal this twenty seventh day of April in the year of our Lord one thousand eight hundred and thirty one.

Solomon Andrews

Witnesses
John W. Watson
James M. Brewster

Ent. 1861.

1386 n.d.